Dec. 29, 1925.
Re. 16,235
W. E. WILLIAMS
TENSION PLATE WHEEL
Original Filed Jan. 8, 1920 2 Sheets-Sheet 1
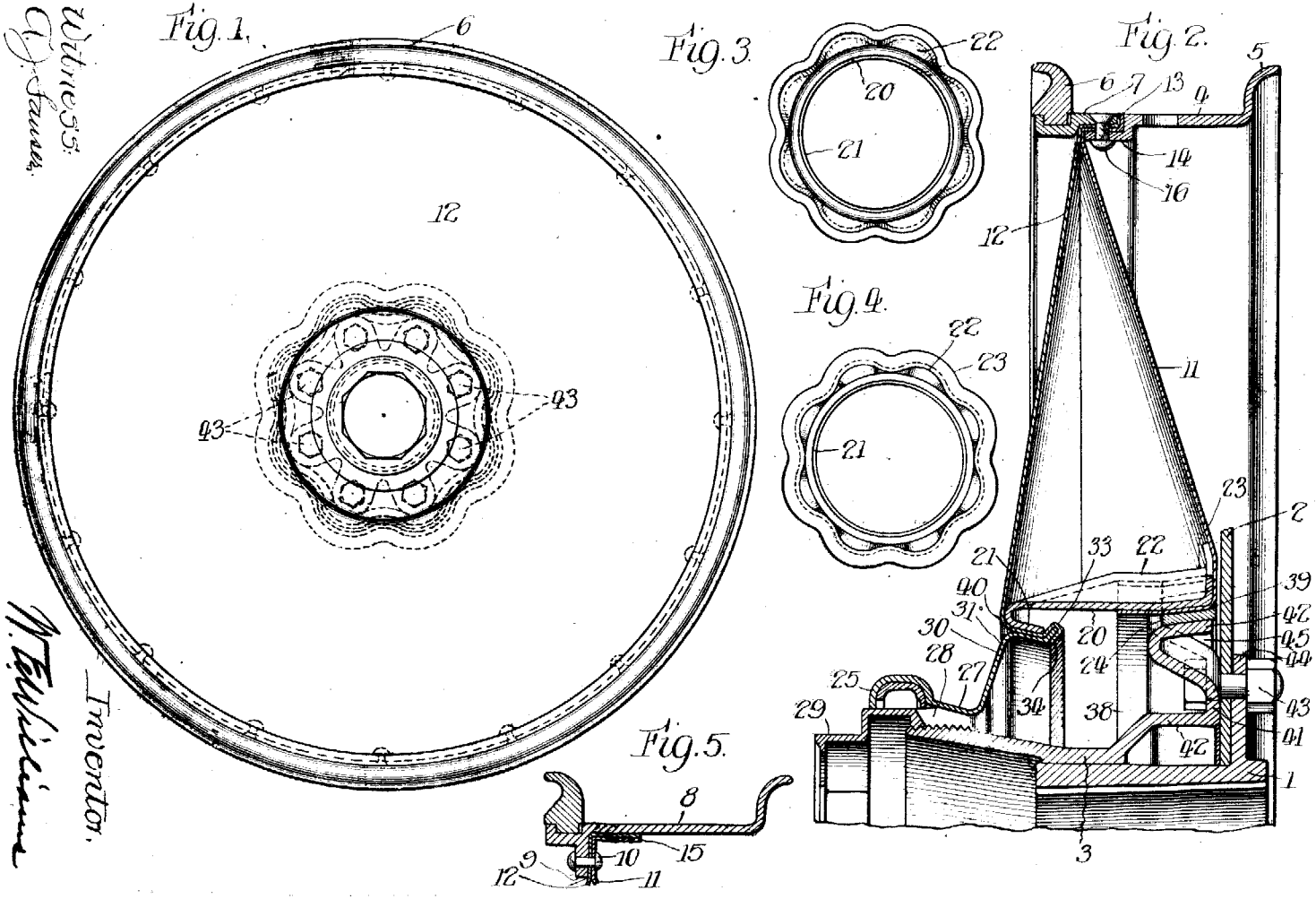
Witness:
A. J. Sauser.
Inventor.
W. E. Williams Dec. 29, 1925 Re. 16,235
W. E. WILLIAMS
TENSION PLATE WHEEL
Original Filed Jan. 8, 1920 2 Sheets-Sheet 2
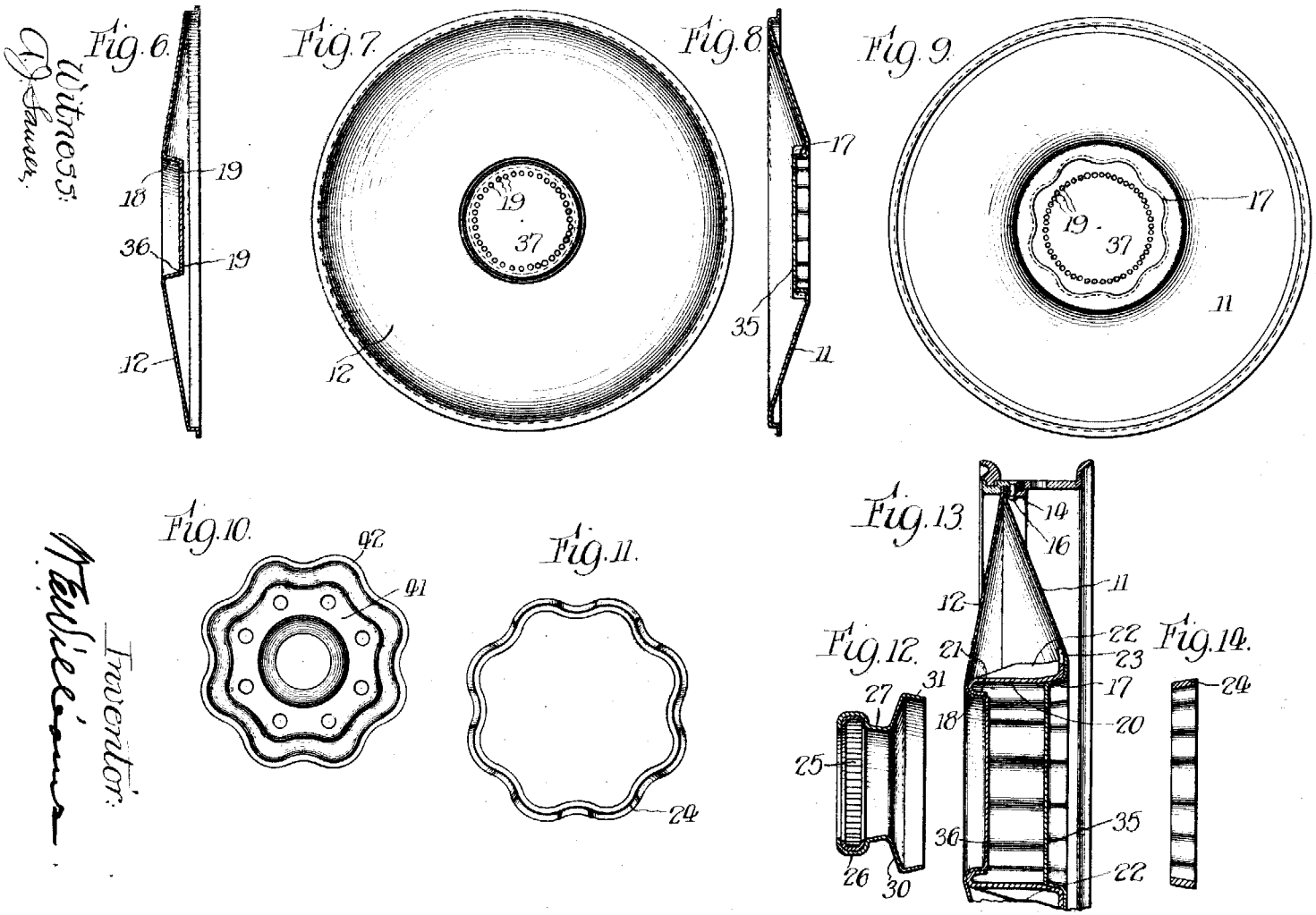
Witness:
A. J. Sauser.
Inventor:
W. E. Williams Reissued Dec. 29, 1925. Re. 16,235

UNITED STATES PATENT OFFICE.

WILLIAM ERASTUS WILLIAMS, OF WILMETTE, ILLINOIS, ASSIGNOR, BY MESNE ASSIGNMENTS, TO STEEL WHEEL CORPORATION, OF LANSING, MICHIGAN, A CORPORATION OF MICHIGAN.

TENSION-PLATE WHEEL.

Original No. 1,398,615, dated November 29, 1921, Serial No. 350,108, filed January 8, 1920. Application for reissue filed February 27, 1923. Serial No. 621,68[illegible]

*To all whom it may concern:*

Be it known that I, WILLIAM ERASTUS WILLIAMS, a citizen of the United States, a resident of Wilmette, in the county of Cook and State of Illinois, have invented a new and useful Improvement in Tension-Plate Wheels.

The object of my invention is to provide a double plate disk wheel for automobiles and other purposes which will be very light and very strong and cheaply made, and in accomplishing this result I seek to use the resistance of the plates to both tensile and compression strains.

Reference will be had to the accompanying drawings, in which Figure 1 is a front elevation of the wheel.

Fig. 2 is a side sectional elevation showing one-half of the wheel but on a larger scale than that of Fig. 1.

Fig. 3 is a front elevation of the sleeve which forms part of the demountable hub.

Fig. 4 is a rear elevation of the part shown in Fig. 3.

Fig. 5 shows a modified form of the rim connection of the disks to the rim.

Fig. 6 shows a vertical cross sectional elevation of the front disk.

Fig. 7 shows a front elevation of the front disk.

Fig. 8 is a cross sectional elevation of the rear disk.

Fig. 9 shows a rear elevation of the rear disk.

Fig. 10 is a rear elevation of the inside hub member that fits on to the regular wooden hub piece.

Fig. 11 is a front elevation of a clamping ring shown in Fig. 14.

Fig. 12 is a cross sectional elevation of the front piece or stamping which forms the front end of the demountable hub.

Fig. 13 is a cross section showing a step in the method of assembling the parts of the wheel.

Fig. 14 shows a clamping ring that is used in fastening the rear disk into the demountable hub or sleeve.

In the drawing, 1 indicates the rear hub casting or forging of a demountable passenger car wheel, and 2 indicates a section of the brake drum ordinarily employed with the wooden wheel.

3 indicates an adapter hub member which is used on the hub member of a wooden wheel.

When this wheel is used as a stock equipment the hub 1 and the adapter hub 3 are made in a single unit as a matter of preference. 4 indicates the tread portion of the rim and 5 the rear flange of the rim and 6 the detachable ring used with what are known as "straight side" tires.

In Fig. 2 I show the tread section 4 composed of two pieces, one of them being the main section 4 and the other the supplemental piece 7, but in the modified form in Fig. 5 the tread section is indicated by 8 and becomes a unitary section which is provided with an internally extending flange 9 to which the disks are attached directly by the rivets 10.

The tension plate disks are formed of thin sheet metal and are indicated in Fig. 2 by the rear disk 11 and the front disk 12, and their outer ends in Fig. 2 are turned over into a Z form as indicated by 13 and are thus interlocked between the lower flange 14 and the main rim portion 4 and the secondary rim portion 7.

In Fig. 5, however, the disks are turned over as indicated by 15 and reliance is placed upon the rivets 10 for holding the disks in place.

In Fig. 2, however, the margins of the disks are not only held by the frictional embrace of the two sections 14 and 7 of the rim, but they are further secured by the series of rivets 16.

In the manufacture of these disks I first prepare them as indicated by Figs. 6, 7, 8, and 9, and in the case of the rear disk 11 I emboss a sleeve-like seat having a corrugated or wavy outline as indicated by 17 while with the front disk this seat has a smooth outline as indicated by 18.

In both disks I form a series of holes indicated by 19 which are on the lines demarking the aperture to be made in the central portion of the disks where they join into the hub members.

The main sleeve portion of the demountable hub to which the disks are permanently secured is indicated by 20, and a front view of this is shown in Fig. 3 and in this view the nose of this hub piece is turned over as indicated by 21 into an internally extending sleeve-like flange.

From this front end, backward, there are tapering corrugations as indicated by 22 which terminate in a wavy flange 23 in harmony with the corrugations 22.

The shape of these corrugations 22 corresponds with the corrugated seat 17 of the disk 11.

In order to firmly lock the disk 11 into the hub piece 22 I provide a corrugated or fluted ring 24 an edge sectional view of which is shown in Fig. 14 and a plan in Fig. 11.

The size and shape of this ring 24 are such that it forms a press fit when the same is seated in place joining the disk 11 into the hub member 22 as indicated in Fig. 2.

At the outer end of the hub I provide the hub stamping or nose piece 25 which may be a malleable casting if desired, but I prefer to make it of a stamping. This nose piece has its outer end 26 in substantially the same form as the nose of the hub of a wire wheel and this hub piece is also provided with an inclined surface 27 against which the tapered inner nose 28 of the nut 29 clamps, which locks the wheel on to the fixed hub.

From the inclined ring portion 27 of this nose piece there extends the wall 30 which is turned over into the flange 31 that bears on the seat 18 of the disk 12 and locks the latter tightly into the hub barrel piece 22.

After this locking operation is completed there is turned over the flange 33 which permanently secures the nose piece 25 into the hub barrel 22 and thus makes the outer sleeve or hub of the demountable wheel.

The metal of the disk 11 is turned around over the flange 33 as is indicated by 34, and thus makes a tight lock of the sheet of metal.

In assembling the parts after the several parts are made and the disks formed as indicated by the Figs. 6 to 9 inclusive, I first assemble the disks into the rim and into the hub barrel 22 as indicated by Fig. 13 and at this stage of the work the disks are firmly secured to the rim.

Then I simultaneously press in the ring 24 and the nose piece 25 from each side and these parts fit against the portions 35 and 36 of the disks and draw the metal of the body of the disks into this cavity or seat and in this drawing operation the middle portions 37, as outlined by the holes 19, Figs. 6 to 9 are torn loose from the main body of the disk and are thus severed and removed and the body of the metal of the disk is drawn tightly into the hub portion, putting tension in the plates all around in the act of assembling the parts.

After the parts are assembled the inner edge of the seat of the front disk 12 is flanged over as indicated by 34, and the inner edge of the disk 11 is flattened out into the flange 38.

After this assembly has taken place I weld with a torch a few spots 39 around the edge of the ring 24, which thus binds this ring into permanent relationship in the disk 11, and the hub barrel 22.

Welding is not necessarily employed in making a secure union of the nose piece 25 of the hub into the hub barrel 22, because it is well secured through the medium of the turned flange 33.

However, as a matter of safety I weld a few spots 40 on the zone around the front of the disk 12 and the flange member 30 of the nose piece.

The inner hub 3 of the wheel is provided with a flange 41 which is turned over into a corrugated flange 42 and the latter flange is fitted to make a close union on the inside of the ring 24 and thus affords the means of preventing the revolution of the hub barrel 22 on the inner hub 3.

The flange 42 is secured by the bolts 43 to the flange 44 of the hub part, which is fixed to the axle but as before described, these two parts may be made a unitary piece.

Hubs corresponding to the part 3 are usually made of malleable iron or forgings and made as I have shown, with the flange 41 bent forward and then turned over into the flange 42, leaving the annular corrugated groove 45, which permits this flange 42 to be stamped exactly to shape with suitable dies, regardless of whether the material is a forging or a malleable casting, which is a desideratum.

It will be readily understood that suitable dies may be made that may finally shape the outer contour of the flange 42 to properly fit the contour of the ring 24 and thus make a cheap and very desirable means for securing a demountable wheel on to the fixed hub.

In assembling the disks I have shown this work may be very quickly accomplished and with a certainty of always securing the desired fit and tension of the parts which is not true in cases where welded sheets or the like are employed.

In securing a metal disc to a hub it is desirable to provide as much as possible against tearing the metal through the torque of the driving power for the wheels. Where bolts have been used for this purpose the metal of the disc is usually so thin that the bolts cut into the metal and elongate the holes or tear the sheet to its destruction. I guard against this feature by the flutes or corrugations 17 in the disc 11 which by means of the increased number as desired of these corrugations the desired strength against torque may be arrived at in any thickness of disc that may otherwise stand the service.

This feature of making an inturned corrugated flange may be used in the assembly of other parts other than I have shown and may be used to a great advantage with wheels of what are known as the single disc construction. The corrugated seat in the hub adapted to fit this corrugated disc may be made also with single disc construction or in other relationships than that that I have shown and still obtain the desired results brought about by this corrugated torque connection which is a great desideratum.

What I claim is:—

1. The combination with a rim and a hub barrel of two discs secured to the rim and having their hub zones forced laterally into and closely fitting the interior of the opposite ends of the hub, respectively, and corresponding clamping rings pressed into and permanently fixed in the in-bent portions of the disks.

2. The combination with a rim and a hub having a barrel, and a nose-piece and clamping ring to enter the ends, respectively, of the barrel, of two sheet metal disks having their central portions laterally flanged and pressed into the ends of said barrel, respectively, and rigidly gripped, respectively, between the interior of the barrel and said nose-piece and clamping ring.

3. In a wheel of the class described, a rim having two disks secured thereto along a common line and the body of the disks diverging from this line to opposite end portions, respectively, of the hub barrel; with clamping members in the ends of the said hub barrel adapted to clamp the hub region of the disks into the hub barrel and provide the bearing surfaces for the wheel on the inner hub.

4. In a wheel of the class described, a rim composed of two parts, one part having an offset annular horizontally extending flange of a diameter smaller than the tread and with the secondary part having a tread flange projecting over the said annular flange; with two disks turned over on their margins and embraced in clamping relation by the two sections of the rim flange and the parts secured together.

5. In a wheel of the class described, two disks forming the web of the wheel and having their outer margins turned over in Z form and with a rim portion provided with clamping flanges that embrace the Z formed edge of the web disks.

6. In a wheel of the class described, having its web portion composed of two disks dished in oppositely disposed relationship to each other and united to the rim along a common line and provided in their hub region with flanges adapted to fit differently inclined portions of the interior of a hub barrel member and means for clamping the said flanges against said interior.

7. In a wheel of the class described, having its web portion composed of two disks dished in oppositely disposed relationship to each other and united to the rim along approximately the same lines and provided in their hub region with flanges adapted to embrace and engage a hub barrel member and means for clamping these said flanges into the hub barrel, said means having bearing surfaces adapted to engage the fixed hub member.

8. In combination, a front disk, a rear disk, a corrugated hub barrel over which fits a lateral, like-corrugated flange of one of the disks, and a like-corrugated clamping ring forcing intimate engagement of the corrugations of the disk and barrel.

9. The combination with a hub having internally sleeve-like slightly tapered end portions, of a rim, two sheet metal disks fixed to the rim and each having a central, cup-like, depressed portion forced into the corresponding end of the hub to put the body of the disk under tension, and members clamping against the sleeve-like hub the disk parts forced into the latter.

10. In a wheel of the class described, having the web formed of disks, a hub barrel embraced by the disks and with the body of the disks turned into the ends of the hub barrel and drawn under tension and secured therein while the tension is held on the disks.

11. In a wheel of the class described, an outer hub and an inner hub, with disks forming the web of the wheel secured to the outer hub under tension and fixed therein while the tension is held thereon.

12. A demountable disk wheel composed of a rim, with two disks forming the web and a demountable hub composed of three pieces, namely a hub barrel, an end piece and a clamping ring and said end piece and clamping ring engaging the metal of the disks and clamping them to the hub barrel.

13. In a metal disk wheel, the combination with an inner hub member, of a hub barrel having end pieces furnishing the bearing surface on the inner hub, and two disks extending outwardly from said end pieces and meeting at the rim.

14. In a device of the class described, a hub connection between the disk and the hub composed of a corrugated flange on the disk at the hub seat and the hub seat fitted to this corrugated flange in a manner that the torque or drive between the hub and rim may be taken up by the said corrugated arrangement of the parts.

15. In a device of the class described, a disk provided with a torque connection between the hub and the disk in the form of a corrugated seat in the disk and a corresponding part in the hub.

16. In a wheel of the class described, the combination with a corrugated hub member of a sheet metal web having an integral corrugated flange adapted to fit over and engage said corrugations on said hub member.

Signed at Chicago, county of Cook, and State of Illinois February 17th, 1923.

WILLIAM ERASTUS WILLIAMS.

Certificate of Correction.

It is hereby certified that Reissue Letters Patent No. 16,235, granted December 29, 1925, upon the application of William Erastus Williams, of Wilmette, Illinois, for an improvement in "Tension-Plate Wheels," were erroneously issued to "Steel Wheel Corporation, of Lansing, Michigan, a Corporation of Michigan," whereas said Letters Patent should have been issued to *American Steel Foundries, Chicago, Illinois, a Corporation of New Jersey*, said corporation being assignee of the entire interest in said invention, as shown by the records of assignments in this office; and that the said Letters Patent should be read with this correction therein that the same may conform to the record of the case in the Patent Office.

Signed and sealed this 9th day of February, A. D. 1926.

[SEAL.]

WM. A. KINNAN,
*Acting Commissioner of Patents.*